April 18, 1967  J. A. PAGE  3,314,733
PNEUMATIC CONVEYING APPARATUS
Filed Dec. 30, 1964  4 Sheets-Sheet 1
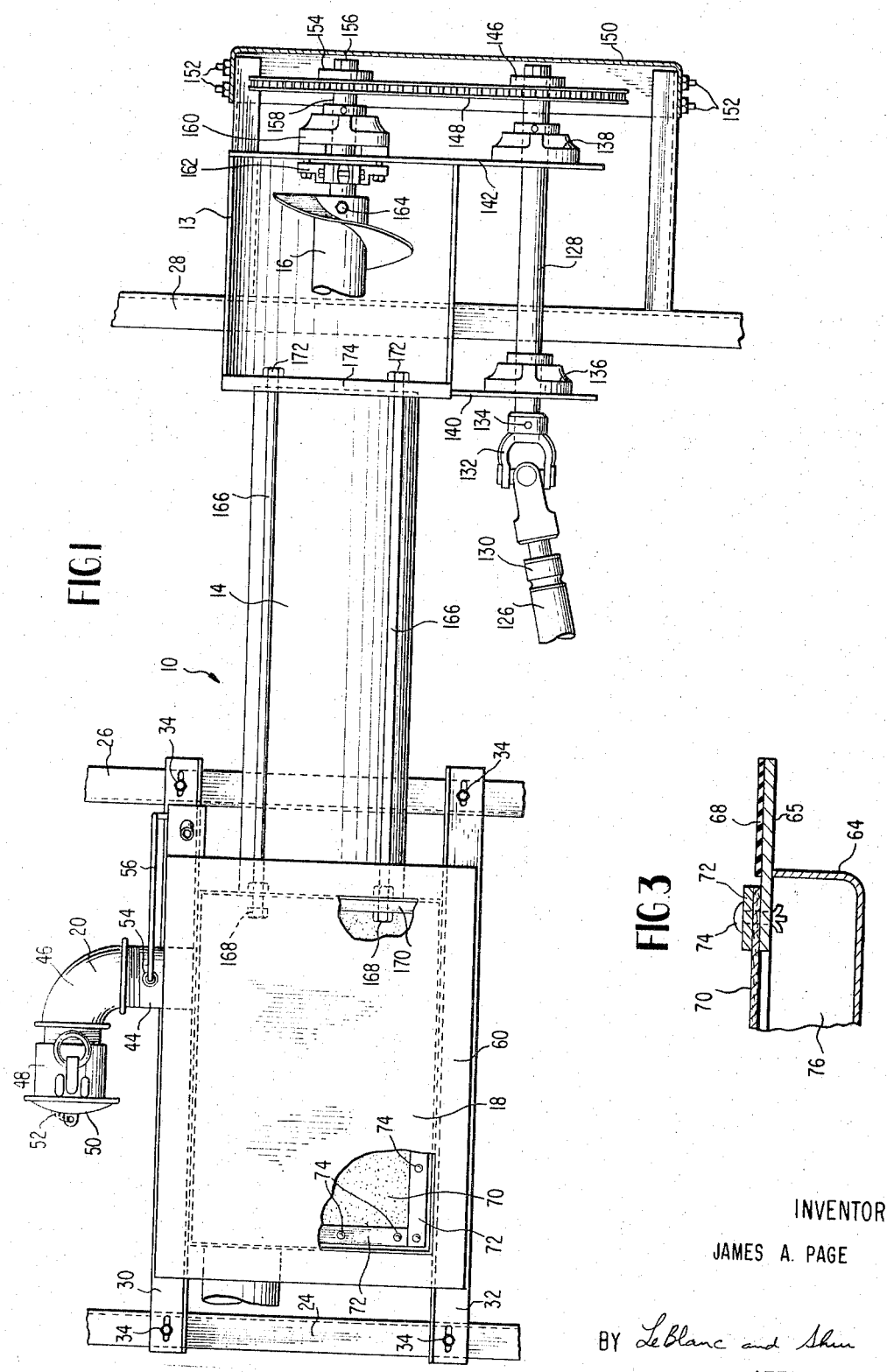
INVENTOR
JAMES A. PAGE
BY LeBlanc and Shur
ATTORNEYS April 18, 1967
J. A. PAGE
3,314,733
PNEUMATIC CONVEYING APPARATUS
Filed Dec. 30, 1964
4 Sheets-Sheet 2
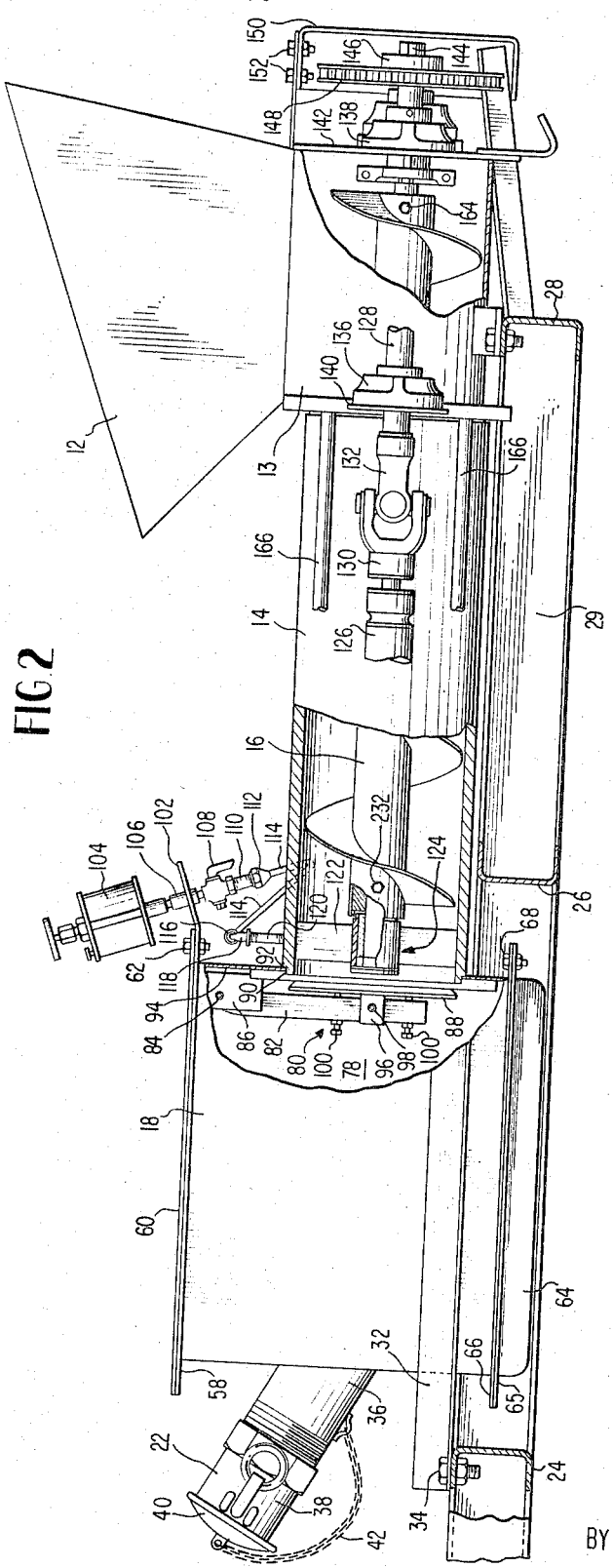
INVENTOR
JAMES A. PAGE
BY LeBlanc and Shur
ATTORNEYS April 18, 1967                    J. A. PAGE                    3,314,733
                         PNEUMATIC CONVEYING APPARATUS
Filed Dec. 30, 1964                                        4 Sheets-Sheet 3

INVENTOR
JAMES A. PAGE

BY  LeBlanc and Shur
                ATTORNEYS

April 18, 1967  J. A. PAGE  3,314,733
PNEUMATIC CONVEYING APPARATUS
Filed Dec. 30, 1964
4 Sheets-Sheet 4
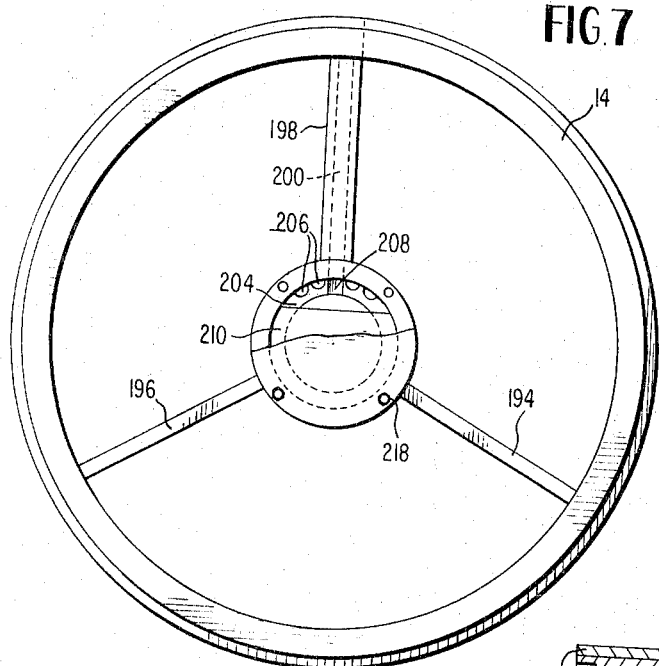
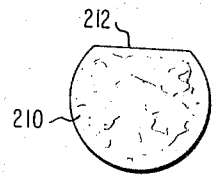
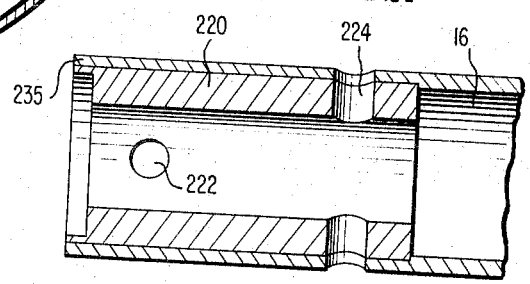
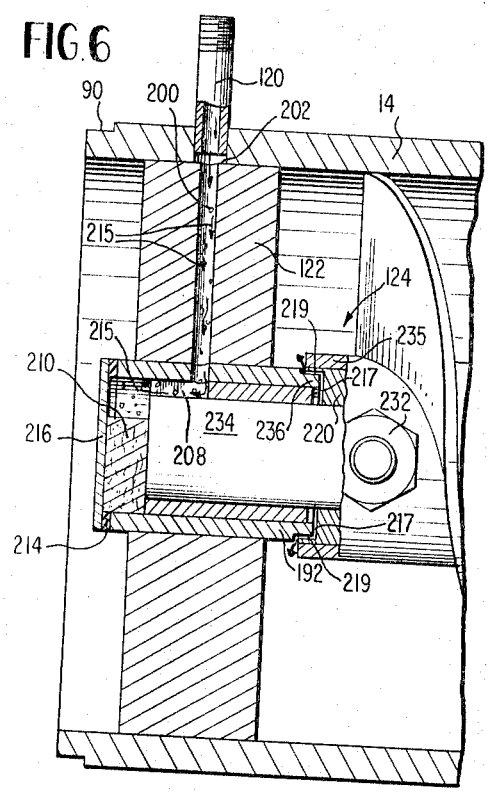
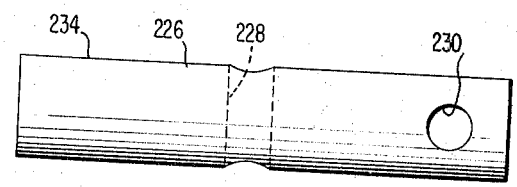
INVENTOR
JAMES A. PAGE
BY LeBlanc and Shur
ATTORNEYS

United States Patent Office 3,314,733
Patented Apr. 18, 1967

3,314,733
PNEUMATIC CONVEYING APPARATUS
James A. Page, Baton Rouge, La., assignor to Delta Southern Co., Houston, Tex., a corporation of Texas
Filed Dec. 30, 1964, Ser. No. 422,326
21 Claims. (Cl. 302—50)

This invention relates to a pneumatic conveying apparatus and more particularly to a device for transferring pulverulent material from one location to another.

The pneumatic conveying apparatus herein described in a device for pneumatically conveying pulverulent materials through a conduit. It may be used to convey a wide variety of pulverulent materials such as Portland cement, fly ash, grain flour and the like, and to transfer it from one storage unit to another.

Devices suitable for this purpose have been proposed in the past but for the most part have been limited to expensive, heavy equipment fixed in location and not adapted to a very large number of dissimilar transfer applications. These prior devices have incorporated heavy machine screws and have relied for pneumatic operation on a ring and orifices, so that they have not only been stationary—that is, not readily transportable—but have also lacked the aerating efficiency of the device of this invention.

These difficulties are overcome by the herein disclosed construction which provides a light weight, cheap and maneuverable device readily transportable and usable for transferring pulverulent material under the most favorable conditions. It can be used to transfer material between two storage bins, or from a mobile unit to a storage bin, and conversely, from a storage bin to a mobile unit. When mounted on a trailer or other suitable vehicle the unit is very mobile but at the same time the device can be manufactured as a stationary unit for use in unloading hopper type rail cars and for other purposes. In all instances improved aeration and efficiency of operation are attained.

Important features of the present invention include the provision of a light-weight screw conveyor discharging directly onto the permeable deck of a pressurized discharge box. A pressure differential is maintained across the permeable deck by a pressure differential relief valve in the input line. At the same time, this pressure differential is utilized to operate an oiling device so as to adequately lubricate the screw bearing while at the same time assuring that pulverulent material cannot gain access to the bearing interior. This is accomplished by maintaining a positive pressure differential across the screw bearing and causing air to continuously pass through this bearing, which air not only conveys lubricating oil to the bearing but also acts to cool the bearing.

In the present invention the entire unit is mounted on a suitable framework, preferably of the portable type, so that it may be hauled to the desired location by trailer. A suitable drive source such as the power take-off from an internal combustion engine is coupled to the unit through a universal joint and acts through a suitable sprocket and chain coupling to drive a rotary feed screw. Pulverulent material is fed to one end of the feed screw through a feed hopper and advances through a conveyor barrel housing the feed screw to a discharge box. The entrance to the discharge box from the feed screw is provided with a flapper-type, one-way or check valve which acts to maintain adequate pressure throughout the entire sealed chamber within the box. Pulverulent material is deposited by the screw directly onto a permeable canvas deck dividing the discharge box into a larger upper or pulverulent material chamber and a lower plenum chamber. Air at an elevated pressure is supplied to the discharge box through a differential or relief valve such that the plenum chamber is maintained at an elevated pressure so as to develop a sufficient pressure drop across the permeable deck to aerate material within the box. The aerated material is discharged or blown out of the box by the lower but nevertheless elevated pressure existing within the upper portion of the box.

It is therefore one object of the present invention to provide a novel pneumatic conveying apparatus.

Another object of the present invention is to provide a readily portable device for pneumatically conveying pulverulent materials through a conduit.

Another object of the present invention is to provide a pulverulent material transfer mechanism having increased aerating efficiency.

Another object of the present invention is to provide a pneumatic conveying device consisting of a pulverulent material feed screw discharging into a pressurized chamber having a permeable deck.

Another object of the present invention is to provide a pneumatic conveyor having an improved conveyor screw bearing construction.

Another object of the present invention is to provide a pneumatic conveying apparatus having a novel air-oiled and air-cooled bearing.

Another object of the present invention is to provide an improved pneumatic conveyor for pulverulent materials having light-weight, extreme maneuverability, relatively simple, inexpensive construction, and better fluidization of the pulverulent material than previously known structures.

These and further objects and advantages of the invention will be more apparent upon reference to the following specification, claims and appended drawings wherein:

FIGURE 1 is a plan view of the pneumatic conveying apparatus of the present invention with parts omitted and parts broken away for clarity;

FIGURE 2 is an elevational view of the device of FIGURE 1, again with portions broken away to show the internal construction of the mechanism;

FIGURE 3 is an enlarged sectional view through a portion of the lower or plenum chamber of the discharge box of FIGURES 1 and 2.

FIGURE 6 is an enlarged, cross-sectional view through the inner feed screw bearing of the device of FIGURES 1 and 2;

FIGURE 7 is an end view of the bearing of FIGURE 6;

FIGURE 8 is an end view of the bearing itself;

FIGURE 9 is a plan view of the bearing of FIGURE 8;

FIGURE 10 is a showing of the end felt for the bearing mount of FIGURE 6;

FIGURE 11 is an enlarged cross-sectional view through the end of the feed screw adjacent the bearing mount of FIGURE 6; and FIGURE 12 shows the tail-end shaft coupled to the feed screw end of FIGURE 11 and rotatably journalled in the bearing mount of FIGURE 6.

Figure 4:
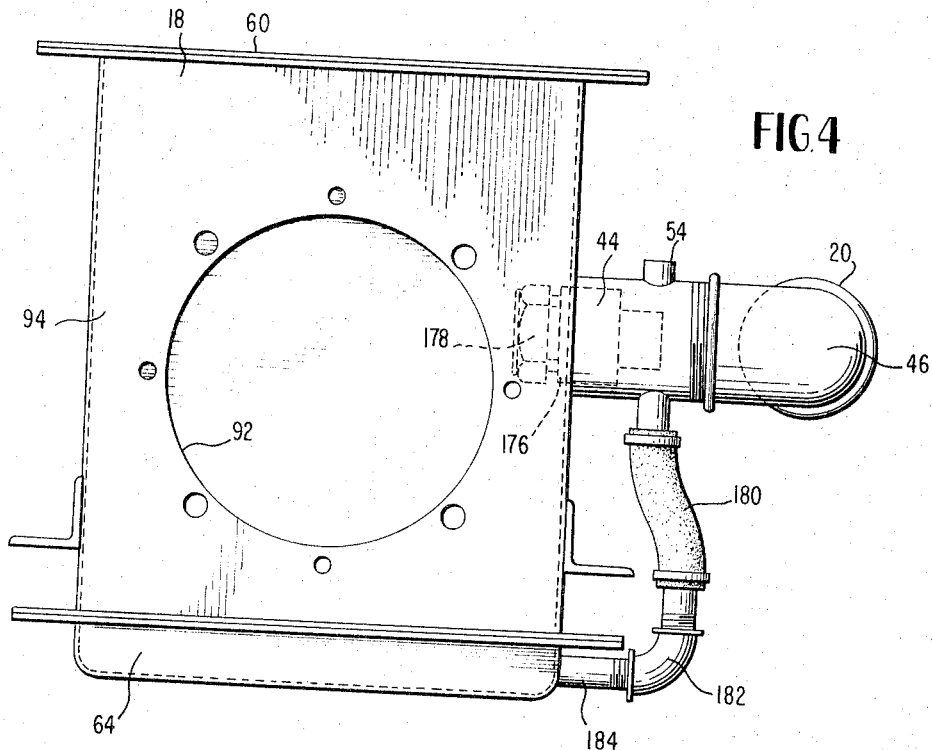
FIGURE 4 is an end view of the discharge box of the device of FIGURE 1, showing the pressure air feed to the plenum chamber at the bottom of the box.

Referring to the drawings, and particularly to FIGURES 1 and 2, the novel conveying device or pneumatic conveying apparatus of the present invention generally indicated at 10 comprises an inlet or feed hopper 12 mounted over a feed box 13, a conveyor barrel 14 housing a conveyor screw 16, in turn feeding a discharge box 18, having an air inlet 20, and a discharge outlet 22. The entire unit is mounted on a suitable framework including transverse angle irons 24, 26 and 28 which in the preferred embodiment form a part of the supporting framework of a motor vehicle trailer for transporting the apparatus to any desired location where it may be desired to empty or fill trucks, trailers, storage bins or other pulverulent material-handling devices. A longitudinal angle iron forming a portion of the supporting framework is illustrated at 29 in FIGURE 2.

A pair of parallel, longitudinal support irons 30 and 32 are secured to the transverse frame members 24 and 26 by machine bolts 34, and these are in turn suitably affixed to the sides of the discharge box 18. This box is provided with a discharge pipe 36 to the end of which is threaded a coupler 38 receiving over its open end a dust plug 40, which dust plug is attached to the discharge pipe 36 by a security chain 42.

Referring to FIGURE 1, discharge box 18 is also provided with an air inlet pipe 44 coupled through elbow 46 to a coupler 48 the end of which is closed off by a similar dust plug 50 secured to the elbow 46 by a security chain 52. A half union and union nut indicated at 54 in FIGURE 1 taps off from the inlet pipe 44 to copper tubing 56 for a purpose more fully described below.

The upper edge of discharge box 18 is provided with a peripheral flange 58 to which is secured a cover 60 by a plurality of machine bolts 62. A gasket (not shown) between the flange 58 and cover 60 seals the upper end of the box. An aerator pan 64 is similarly secured to a lower flange 66 on the discharge box 18 by a plurality of machine bolts 68. The lower end of the box is sealed by a similar annular cork neoprene gasket 68 (FIGURE 3) between flange 65 of the aerator pan and 66 of the discharge box.

As best seen in FIGURE 1, a rectangular sheet of air permeable canvas 70 is stretched across the interior of the discharge box 18 and its outer edges overlie the inner edge of the flange 69. This layer of canvas is formed from 2-ply, solid-woven, untreated cotton belting and is air permeable. The canvas is joined along its edges to the flange 65 by four metal strips 72 through which pass a plurality of spaced rivets 74. The aerator pan 64 and canvas 70 define a lower chamber or plenum chamber 76 in the lower portion of the discharge box 18.

Permeable canvas deck 70 also forms the lower wall for the upper chamber 78 in the discharge box which is provided at one end, as best seen in FIGURE 2, with a one-way or flapper-type check valve generally indicated at 80. This valve comprises a flapper arm 82 pivoted by a roll pin 84 from a support bracket 86 and this flapper arm carries a flapper 88 adapted to seat over the open end of the conveyor barrel 14. Pulverulent material is fed from the screw 60 through this open end of the barrel past the flapper 88 and onto the canvas deck 70. The barrel is provided with a recessed end 90 secured in aperture 92 formed in the end wall 94 of the discharge box. Flapper 88 is secured to the flapper arm 82 by a bracket 96 and is pivoted to the flapper arm by means of the roll pin 98. A pair of adjusting screws 100 are provided to permit adjustment in the angular position of the flapper 88 to insure a good seat on the end of the conveyor barrel.

Referring to FIGURE 2, a small plate 102 is attached to the top of the discharge box 18 by one of the machine bolts 62 and this plate supports a conventional oiler 104 of the vacuum pump style. By way of example only, the oiler may be of the type identified as style DH manufactured by the Oil Rite Corporation, 2318 Waldo Boulevard, Manitowoc, Wisconsin. Other suitable oilers are also commercially available. Connected to the lower end of the oiler is a reducing coupling 106 which feeds oil through a 2-way valve 108 to a coupling T 110. The output from the coupling T is to a union nut 112 joining the T to copper tubing 114. The copper tubing extends downwardly and then upwardly to a second union nut 116 and an elbow 118 and finally terminates in a nipple 120 threaded through the wall of the conveyor barrel 14 and communicating with a suitable aperture in a bearing spider 122 mounted in the left-hand of the conveyor barrel in FIGURE 2. The spider supports a bearing assembly generally indicated at 124 in which is journalled the end of the rotary supporting structure for the feed screw 16.

The pneumatic conveying apparatus 10 is adapted to be driven from the power takeoff of an internal combustion engine or from any suitable drive source such as an electric motor or the like by way of a power shaft 126 coupled to a jack shaft 128 by way of a universal joint 130, end yoke 132 and roll pin 134. Jack shaft 128 is journalled in a pair of Fafnir bearings 136 and 138 attached to support plates 140 and 142. Plate 142 also acts as an end plate for the feed box 13. The end of jack shaft 128 is keyed as at 144 and receives a sprocket 146 over which passes one end of a cottered chain 148. A chain guard 150 is attached to the feed box 13 by a plurality of machine bolts 152.

Chain 148 passes around a second sprocket 154 received over the keyed end 156 of a drive shaft 158. This shaft is journalled in Fafnir bearing 160 and passes through a split dust seal gland 162 to be joined by a pair of transverse coupling bolts, such as that indicated at 164, to the other end of the feed screw 16. Thus the feed screw 16 is chain-driven from the power shaft 126 connected to the prime mover by way of jack shaft 128, cottered chain 148 and drive shaft 158. In order to provide strength to the unit, the hopper base or feed box 13 is joined to the discharge box 18 by 4 elongated metal bars 166 running parallel with but external of the conveyor barrel 14. These bars are attached by hex nuts 168 to reinforcing irons 170 in the discharge box 18 as illustrated in FIGURE 1, and similarly by hex nuts 172 to reinforcing irons 174 in the feed box 13.

An important feature of the present invention resides in the provision of an arrangement whereby the air pressure in the lower or plenum chamber 76 of the discharge box is higher than the pressure above the canvas deck in upper chamber 78. Referring to FIGURE 4, the air inlet 20 is coupled through the elbow 46 to the inlet pipe 44. Threaded into the inner end of the inlet pipe 44 and passing through the wall of box 18 is a half coupling 176 which carries at its inner end a differential relief valve 178. This valve is of conventional construction and by way of example only may be a spring-loaded differential relief valve of the type manufactured by the Roots Connersville Company, a division of Dresser Industries, Inc., Connersville, Indiana. The valve in one embodiment constructed in accordance with the present invention maintained a 3 p.s.i.g. pressure differential between the inlet air pressure to inlet 20 and that existing within chamber 78. This is brought about by connecting an air hose 180 to the under side of inlet pipe 44 and passing the incoming air through this air hose and through an elbow 182 and a nipple 184 directly to the interior of plenum chamber 176. By means of the differential valve 178 the pressure of the air passing through flexible hose 180 and into the plenum chamber is constantly maintained about three pounds per square inch higher than the air pressure within chamber 78.

Another important feature of the present invention is the provision of an arrangement whereby air under pressure is also supplied to the bearing assembly 124 of FIGURE 2. This air acts in a threefold way to not only cool the bearing, but also to carry oil from the oiler 104 into the bearing for the purposes of lubricating the bearing, and further insures that the incoming pulverulent material will not gain access to the interior of the bearing.

Figure 5:
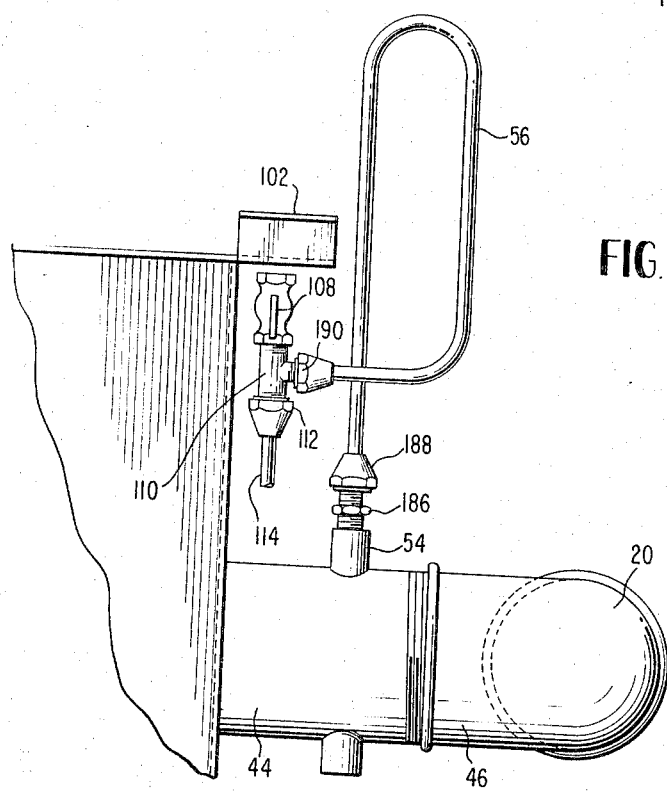
FIGURE 5 is a partial end view similar to that of FIGURE 4 showing the inlet air feed to the oiler of FIGURE 2.

Referring to FIGURE 5, inlet pipe 44 is coupled at outlet 54 through the half union 186 and union nut 188 to copper piping 56, also illustrated in FIGURE 1. This copper tubing is coupled through union nut 190 to T 110 beneath the 2-way valve 108, receiving lubricant from the oiler 104 of FIGURE 2. When the device is in operation valve 108 is manually opened so that drops of oil pass through the reducing coupling 106 and the now open valve 108 into the T 110, where the drops are swept up by the incoming air from copper tubing 56 and carried downwardly with the air through tubing 114 and nipple 120 of FIGURE 2 into the spider 122 and finally into the bearing assembly 124.

The details of the bearing assembly 124 are illustrated to an enlarged scale in FIGURES 6 and 7, wherein the spider 122 comprises a hub 192 and three angularly spaced arms 194, 196 and 198 joined to the inner surface of the conveyor barrel 14. A passageway 200 is formed in the vertical arm 198 of the spider and in the hub 192 and communicates with an aperture 202 in the top of the conveyor barrel receiving the nipple 120.

Received within hub 192 of the spider is an annular sintered bronze bearing 204 shown in detail in FIGURES 8 and 9, which bearing is provided with four air leak grooves 206 in its outer, upper surface, and with an elongated slot 208. The inner end of the bearing 204 abuts against a felt pad 210 of substantially circular configuration which is cut off flat along the line 212 in FIGURE 10 substantially coincident with the inner surface of the bearing and adjacent slot 208. Hub 192 is sealed by an annular cork neoprene gasket 214 positioned between the end of the hub and end cap or cover plate 216. A plurality of bolts 218 pass through the cover plate and gasket securing them to the inner end of the hub or bearing housing 192.

FIGURE 11 shows the inner end of the feed screw 16 which rotates adjacent the bearing assembly 124. Press fit within the hollow end of the feed screw 16 is a bushing 220 provided with transverse apertures 222 and 224 spaced from each other and directed at 90° angles to each other through the bushing. These apertures are aligned with similar apertures provided in the feed screw 16. FIGURE 12 shows the tail shaft 226 which is received within the bushing 220 and provided with aligned transverse apertures 228 and 230. In this way the right-hand end of the tail shaft is secured to bushing 220 and hence to the feed screw 16 by a pair of bolts one of which is illustrated at 232 in FIGURE 2, passing through these aligned apertures. The left-hand end 234 of the tail shaft rotates in the bearing 204 of FIGURE 6 such that the extreme end 235 of the feed screw 16 of FIGURE 11 is slightly spaced from the adjacent reduced end 236 of the spider hub and is of slightly larger diameter to overlie this reduced end of the hub. This arrangement provides a tortuous path for the ingress of pulverulent material passing along the feed screw into the bearing, thus reducing the likelihood of pulverulent material entering the bearing and contaminating the rotating surfaces.

In operation, power shaft 126 is connected to a prime mover so that the feed screw 16 begins to rotate. Pulverulent material such as Portland cement, fly ash, grain flour or the like, is fed from a suitable supply into the feed hopper 12, from which it falls by gravity into the open topped feed box 13 and is advanced by the rotating screw 16 along conveyor barrel 14 towards the discharge box 18. At the same time, pressurized air is supplied to air inlet 20 from a suitable source where it passes through the piping and through differential relief valve 178 into the chamber 78 inside the discharge box. The interior of the discharge box above the canvas deck 70 may be typically at a pressure of from 4 to 6 pounds p.s.i.g. and this air is prevented from escaping from the box through the action of the check valve 80 which is provided to close off the delivery end of the conveyor barrel. Pulverulent material advances along the feed screw, then passes through the check valve to be deposited upon the canvas deck 70. Escape of air through the barrel is normally prevented by material being fed through the barrel by the screw feeder. This material holds the check valve open, except at start-up and when flow of material into the hopper is stopped and the screw becomes unloaded. At such times the check valve closes to prevent blow-back of high pressure air.

At the same time, delivery air which may be typically at a pressure of approximately 7 to 9 pounds p.s.i.g., i.e., 3 pounds higher than the pressure on the other side of the differential relief valve within the discharge box, is fed through the flexible hose 180 of FIGURE 4 into the plenum chamber 76 of FIGURE 3 at the lower end of the box. The 3-pound differential pressure maintained by the relief valve 178 appears across the canvas deck 70 and the air passes through this previous canvas material from the plenum chamber 76 to the pressure chamber 78, at the same time fluidizing the pulverulent material which has been deposited on the canvas deck by the feed screw 16. This fluidized material is blown out or discharged through outlet 22 of FIGURE 2, due to the lower but nevertheless still above-atmospheric pressure within chamber 78, and deposited in a storage bin, truck, railroad car, or conveyor, as the case may be. In operation the dust plug is removed and a suitable conveying hose (not shown) is connected to coupler 22 which hose is used to conduct the fluidized material to its destination.

The incoming air, at approximately 7 to 9 pounds of pressure above atmosphere, is also supplied by way of the copper tubing 56 to the T beneath the oiler 104. Two-way valve 108 is manually opened when the device is running so that drops of oil are passed from the oiler downwardly into the T where they are picked up by the aspirating action of the incoming air and carried through the copper tubing 114 by way of the nipple 120 and spider 122 into the bearing assembly 124. The incoming air and oil move through passageway 200 of FIGURE 6 into the slot 208, where the oil is collected on the end 234 of the tail shaft and in the felt pad 210. However, the small grooves 206 illustrated in FIGURES 8 and 9, along the upper surface of the bearing, provide an exit or leakage passageway for the pressurized air which passes outwardly through these grooves and through the tortuous path around projecting edge 236 of the hub and overlying edge or lip 235 of the screw to escape into the interior of the conveyor barrel. The tortuous nature of the air path through the bearing assures that all of the captured oil will be deposited either on the rotating metallic parts to lubricate these parts or will be collected in the felt pad 210 to be supplied as a lubricant to the metal elements under the pumping action of the rotating shaft journalled in the bearing. The air which escapes from the bearing is substantially completely free of oil and exits at a sufficient pressure to maintain the bearing completely free of pulverulent material. In this way the air acts (1) carry oil to and completely through the bearing for the purposes of lubricating the bearing, (2) acts as a fluid coolant for the bearing, and (3) blows out or washes away any pulverulent material which might otherwise gain access to the bearing between the rotating elements of the feed screw and the bearing housing.

More specifically, the over-hanging lip 235 of the screw is provided to prevent the force exerted by the movement of the conveyed material from forcing it into the bearing. In other words the lip acts as a deflector. Also there is injected into the bearing a mixture of air and oil droplets as indicated by the arrows 215 and dots 217 respectively in FIGURE 6 under a pressure that is always above that surrounding the bearing. First the mixture travels through slot 208 to the open space 215 in FIGURE 6 where the oil droplets and adhering film tend to fall or flow downward, while the air is forced to make an abrupt turn into the grooves 206 along the upper bushing surface. This abrupt turn of the air causes the heavier oil to be thrown out of the airstream by centrifugal force. The felt wick 210 serves to trap the oil from the airstream and then acts as a reservoir from which oil is gradually fed into the bearing surfaces. It is especially significant in cases where through neglect the operator may forget to keep the oiler functioning when the machine is in operation.

At the discharge end of the grooves 206 the air enters an annular space 217 which is large enough to act as a plenum chamber and which allows the velocity head of the air to be converted into static pressure approximately equal all around the shaft 234. At this point the overlapping lip 235 serves its second and most important function. The clearance between the projecting edge 236 of the hub and the lip 235 is held to the closest tolerance that is consistent with this type of bearing, providing the maximum restriction to air flow through annular orifice 219, which in turn gives maximum velocity to the annular stream of escaping air. It is this high velocity which keeps the fine particles of pulverulent material from entering the bearing.

It is apparent from the above that the present invention provides a novel pulverulent material delivery device, and particularly an apparatus for pneumatically conveying pulverulent material. The unit is of relatively simple, inexpensive and light-weight construction and is particularly suited for mounting on an automotive trailer or the like so as to be completely portable and transportable to any desired location.

In one embodiment constructed in accordance with the present invention, the feed screw had an overall length of 37¼ inches, and drive shaft 158 was 12¼ inches long and the tail shaft 226 was 7⅝ inches long. In this embodiment the discharge box was approximately 2 feet long, 1½ feet wide and 1 foot 4½ inches deep. The distance from the bottom of canvas deck 70 to the bottom of plenum chamber pan 76 was 1¾ inches. Typical rotational speeds for the feed screw are in the neighborhood of 480 to 500 r.p.m. and the inlet air pressure at inlet 20 in this embodiment was 9 pounds p.s.i.g. with a 3-pound drop across the differential relief valve. The outside diameter of the threads on the feed screw in this embodiment was 8½ inches.

The above dimensions are given by way of example only for a specific embodiment utilized for short deliveries where it is only necessary to transfer pulverulent material over short distances. Larger units can be constructed for converging material several hundred feet, and in this case a larger inlet pressure is required, in the neighborhood of 30 to 40 p.s.i.g., to insure adequate delivery of the fluidized material over these longer distances.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pulverulent material conveying device comprising a discharge box having a pair of pressurized gas inlets and a discharged outlet, a gas permeable deck in said box separating said box into a pressure chamber and a plenum chamber, one of said inlets communicating with each of said chambers, said discharge outlet communicating with said pressure chamber, means for maintaining a positive pressure differential across said deck, feed screw means, and a check valve coupling said feed screw means to the interior of said pressure chamber.

2. A device according to claim 1 wherein said pressure differential maintaining means comprises a pressure differential relief valve in one of said gas inlets.

3. A pneumatic conveying device comprising a discharge box, an air permeable deck in said box separating said box into a pressure chamber and a plenum chamber, an air inlet pipe and a discharge pipe communicating with said pressure chamber, means coupling said inlet pipe to said plenum chamber, a differential pressure relief valve in said inlet pipe for maintaining a pressure drop across said deck, a feed screw barrel, a feed screw rotably mounted in said barrel, check valve means coupling one end of said feed screw to said pressure chamber, hopper means communicating with the other end of said feed screw, a support bearing in said barrel for one end of said feed screw, and means for passing cooling air through said bearing.

4. A device according to claim 3 wherein said cooling air passing means is coupled to said air inlet pipe.

5. A pneumatic conveying device comprising a discharge box, an air permeable deck in said box separating said box into a pressure chamber and a plenum chamber, an air inlet pipe communicating with said pressure chamber, a discharge pipe communicating with said pressure chamber at a point spaced from said deck, air passage means coupling said inlet pipe to said plenum chamber, a pressure differential relief valve between said chambers for maintaining a pressure differential across said deck, a feed screw barrel, a feed screw rotatably mounted in said barrel, check valve means coupling one end of said feed screw to said pressure chamber, hopper means communicating with the other end of said feed screw, a bearing in said barrel for supporting said one end of said feed screw, said bearing having an air passage therethrough discharging into said barrel between said bearing and said feed screw, air conduit means coupling said inlet pipe to said bearing air passage, an oil reservoir mounted adjacent said bearing, and means for feeding drops of oil from said reservoir into said air conduit means.

6. A device according to claim 5 wherein said discharge box, barrel and said hopper means are all mounted on a transportable frame.

7. A device according to claim 5 including a spider in said barrel having an annular hub supporting said bearing, said bearing being sleeve shaped and having at least one longitudinal groove in its outer surface for the passage of air.

8. A device according to claim 7 wherein said feed screw comprises a threaded feed shaft having a hollow end, a tail shaft received in said hollow end of said feed shaft and rotatable in said bearing, said feed shaft and bearing hub having overlapping portions defining a tortuous path for air between said bearing groove and the interior of said barrel.

9. A device according to claim 8 wherein said bearing has a longitudinal slot at the outlet of said air conduit means, and a felt pad in said bearing abutting the end of said tail shaft, said slot communicating with said felt pad.

10. A device according to claim 9 including chain drive means coupled to said feed screw.

11. A device according to claim 10 including a feed box beneath said hopper means, and a plurality of reinforcing bars connecting said feed box and said discharge box.

12. In a material conveying device, a feed screw including a rotary shaft, a bearing housing, a support bearing in said housing receiving at least a portion of said shaft for rotation therein, means defining a lubricant reservoir chamber in said housing adjacent said bearing, means for feeding a mixture of lubricant and air under pressure to said reservoir chamber, and means including an annular outlet orifice adjacent said feed screw for discharging air from said reservoir chamber through said orifice.

13. Apparatus according to claim 12 wherein said discharging means comprises means defining at least one air passageway through said bearing coupling said chamber with said orifice.

14. In a material conveying device, a feed screw including a rotary shaft, said shaft having a larger diameter portion and a reduced end portion, a bearing housing, a support bearing in said housing receiving at least a part of said reduced end portion of said shaft for rotation therein, means for passing cooling air under pressure through said bearing, means defining a plenum chamber for developing a static air pressure head communicating with said air passing means, and an annular outlet orifice communicating with said plenum chamber for discharging air from said bearing between said housing and said larger diameter portion of said screw shaft.

15. Apparatus according to claim 14 wherein said rotary shaft is at the discharge end of said feed screw.

16. In a material conveying device, a feed screw including a rotary shaft, said shaft having a larger diameter portion and a reduced end portion, a bearing housing, a support bearing in said housing receiving at least a part of said reduced end portion of said shaft for rotation therein, means defining a lubricant reservoir chamber in said housing adjacent said bearing, means for feeding a mixture of lubricant and air under pressure to said reservoir chamber, outlet passageway means communicating with said chamber for causing said air to undergo centrifugal motion in said chamber whereby lubricant is deposited from said mixture in said chamber, means defining a plenum chamber communicating with said passageway means for developing a static pressure head, and means defining an annular discharge orifice for discharging air from said plenum chamber between said housing and said larger diameter portion of said screw shaft.

17. In a material conveying device, a feed screw including a rotary shaft, a bearing housing, a support bearing in said housing receiving at least a portion of said shaft for rotation therein, means defining a lubricant reservoir chamber in said housing adjacent said bearing, means for feeding a mixture of lubricant and air under pressure to said reservoir chamber, outlet passageway means communicating with said chamber for causing said air to undergo centrifugal motion in said chamber whereby lubricant is deposited from said mixture in said chamber, means defining a plenum chamber communicating with said passageway means for developing a static pressure head, said bearing housing having an annular projection, and an annular lip on said feed screw coaxial with and adjacent said projection whereby said projection and lip define an annular air discharge orifice from said plenum chamber to the space exterior of said feed screw.

18. Apparatus according to claim 17 wherein said lip radially overlies said projection.

19. In a material conveying device having a rotatable member supported by a shaft journaled in a bearing and subject to contamination by the entrance into the bearing of foreign matter, the improvement comprising a bearing housing, a support bearing in said housing receiving at least a portion of said shaft for rotation therein, means defining a lubricant reservoir chamber in said housing adjacent said bearing, means for feeding a mixture of lubricant and air under pressure to said reservoir chamber, means defining a plenum chamber for developing a static air pressure head communicating with said lubricant reservoir chamber, and means defining an annular outlet orifice communicating with said plenum chamber for discharging the air from said bearing between said housing and said rotatable member.

20. Apparatus according to claim 19 wherein said rotatable member includes an annular lip surrounding a portion of said housing, said lip being spaced from said housing to define said annular discharge orifice between said lip and said housing portion.

21. A pneumatic conveying device comprising a discharge box, an air permeable deck in said box separating said box into a pressure chamber and a plenum chamber, an air inlet pipe and a discharge pipe communicating with said pressure chamber, means coupling said inlet pipe to said plenum chamber, a differential pressure relief valve in said inlet pipe for maintaining a pressure drop across said deck, a feed screw barrel, a feed screw rotatably mounted in said barrel, check valve means coupling one end of said feed screw to said pressure chamber, hopper means communicating with the other end of said feed screw, a support bearing in said barrel for one end of said feed screw, means for passing cooling air through said bearing, said cooling air passing means being coupled to said air inlet pipe, an oiler, and means coupling said oiler to said air passing means whereby oil is supplied with said air to said bearing.

References Cited by the Examiner

UNITED STATES PATENTS

| | | | |
|---|---|---|---|
| 1,941,572 | 1/1934 | Morrow | 302—50 |
| 2,448,745 | 9/1948 | Struckman | 302—50 |
| 2,527,455 | 10/1950 | Schemm | 302—29 |
| 2,734,782 | 2/1956 | Galle | 302—53 |
| 2,793,914 | 5/1957 | Gardeniers et al. | 302—50 |
| 3,004,799 | 10/1961 | Tikal | 302—50 |
| 3,106,428 | 10/1963 | Lenhart | 302—50 |

ANDRES H. NIELSEN, *Primary Examiner.*